United States Patent [19]
Jensen et al.

[11] Patent Number: 5,691,255
[45] Date of Patent: *Nov. 25, 1997

[54] MAN-MADE VITREOUS FIBER WOOL

[75] Inventors: Soren Lund Jensen, Holte; Vermund Rust Christensen, Roskilde, both of Denmark

[73] Assignee: Rockwool International, Denmark

[*] Notice: The term of this patent shall not extend beyond the expiration date of Pat. No. 5,614,449.

[21] Appl. No.: 569,144

[22] PCT Filed: Apr. 12, 1995

[86] PCT No.: PCT/EP95/01414

§ 371 Date: Apr. 8, 1996

§ 102(e) Date: Apr. 8, 1996

[87] PCT Pub. No.: WO95/29135

PCT Pub. Date: Nov. 2, 1995

Related U.S. Application Data

[63] Continuation-in-part of Ser. No. 525,590, Sep. 8, 1995, Pat. No. 5,614,452.

[30] Foreign Application Priority Data

Apr. 19, 1994 [WO] WIPO ............... PCT/EP94/01215
Dec. 30, 1994 [GB] United Kingdom ............... 9426429

[51] Int. Cl.$^6$ ............... C03C 13/06; C03B 37/04
[52] U.S. Cl. ............... 501/36; 501/38; 501/70; 65/454
[58] Field of Search ............... 501/35, 36, 70, 501/72, 38; 65/454

[56] References Cited

U.S. PATENT DOCUMENTS

| | | | |
|---|---|---|---|
| 4,205,992 | 6/1980 | Mogensen et al. | 501/36 |
| 5,108,957 | 4/1992 | Cohen et al. | 501/35 |
| 5,250,488 | 10/1993 | Thelohan et al. | 501/36 |
| 5,312,806 | 5/1994 | Mogensen | 501/36 |
| 5,332,698 | 7/1994 | Nyssen et al. | 501/38 |
| 5,332,699 | 7/1994 | Olds et al. | 501/36 |
| 5,401,693 | 3/1995 | Bauer et al. | 501/36 |
| 5,523,264 | 6/1996 | Rapp et al. | 501/35 |
| 5,523,265 | 6/1996 | Mattson | 501/35 |
| 5,614,449 | 3/1997 | Jensen | 501/38 |

FOREIGN PATENT DOCUMENTS

| | | | |
|---|---|---|---|
| 0009418 | 9/1979 | European Pat. Off. | |
| 0247817 | 12/1987 | European Pat. Off. | |
| 0412878 | 1/1990 | European Pat. Off. | |
| 0459897 | 4/1995 | European Pat. Off. | |
| WO87/05007 | 8/1987 | WIPO | |
| 92/09536 | 6/1992 | WIPO | |
| 93/22251 | 11/1993 | WIPO | |
| 95/32926 | 12/1995 | WIPO | C03C 13/00 |
| 95/32927 | 12/1995 | WIPO | C03C 13/00 |

OTHER PUBLICATIONS

Database WPI, Section Ch, Week 7710, Derwent Publications Ltd., London, GB; Class F, AN 77–16933Y & JP,A,50 090 719 (Nihon Muki Zairyo) 21 Jul. 1975.

*Primary Examiner*—Mark L. Bell
*Assistant Examiner*—Louis M. Troilo
*Attorney, Agent, or Firm*—Brumbaugh, Graves, Donohue & Raymond

[57] ABSTRACT

The production and physiological dissolution rate of mineral wool formed of MMV fibers containing 35–66% $SiO_2$, up to 10% $Al_2O_3$, 10–45% CaO, 2–30% MgO, up to 10% FeO, 0–7% $Na_2O+K_2O$ and 0–10% $TiO_2$ is improved by including both $P_2O_5$ and $B_2O_3$ in the composition.

16 Claims, No Drawings

MAN-MADE VITREOUS FIBER WOOL

This is a continuation-in-part of U.S. patent application Ser. No. 08/525,590, filed Sep. 8, 1995, now U.S. Pat. No. 5,614,452.

BACKGROUND OF THE INVENTION

The present invention relates to man-made vitreous fibre (MMVF) wool containing iron and a relatively high amount of alkaline earth metals, and a low amount of alkali metals, conventionally known as stone, slag or basalt wool.

Various types of MMV fibres are known.

It is known, in the manufacture of traditional glass fibres, to include in the glass melt components which provide boron oxide (borate). This can improve the glass and the glass melt. However, borate-containing raw materials are expensive and are normally not added at all if possible, especially when the product contains iron and has low alkali and high alkaline earth content, as in conventional rock, stone and slag melts.

Glass wool products usually have a relatively high content of alkali metal (often above 13% $Na_2O+K_2O$). In this specification all analyses are expressed by weight of total composition measured as oxides. Glass filament and glass wool are usually free of iron but often also contain boron. Typically they contain less than 7% $Al_2O_3$. However E-Glass is a filamentary or other non-wool product and can have high aluminium and low or zero alkali metal. For instance JP-A-50090719 describes an E-Glass containing 15–16% $Al_2O_3$, 9.5–10.5% $B_2O_3$ and 5% $P_2O_3$. It is free of iron and sodium.

Glass fibres are described in EP-A-9418 which can have a wide range of optional components including, inter alia, iron, boron and phosphorous. None of the exemplified compositions contain both boron and phosphorous and they all have above 13% alkali metal oxide.

WO93/07741 describes fibres containing 0 to 4% $P_2O_5$, above 13% $Na_2O$, and up to 8% $Al_2O_3$ for use in horticulture. $B_2O_3$ can be present but the total amount of impurities (including any $B_2O_3$ which is included) must be not above 1%.

Glass wool is described in EP-A-412878 which has high alkali metal content (above 13%) and which contains borate. It is free of iron. Phosphorous is an optional component. It is included allegedly to improve solubility of the fibres.

We are concerned with improving the solubility of the fibres in those wools generally referred to as rock, stone, slag or basalt wools and which typically contain iron, a low amount of aluminium (below 10%), a low amount of alkali metal (below 7%) and a significant amount of alkaline earth metal (above 12%).

It has been proposed that it would be desirable to provide such wools in which the MMV fibres are soluble in a physiological medium, in particular lung fluid.

It is known that the composition of a fibre can significantly affect its solubility. For instance, it is illustrated in WO87/05007 that fibres having a low alumina content, in particular alumina below 10% by weight of composition, have improved solubility in a physiological environment. It is also known that inclusion of phosphorus can improve solubility in the physiological medium. This has been illustrated in the case of stone wool fibres in for instance EP-A-459,897. This discloses stone wool fibres which comprise 1 to 10% of phosphorus as $P_2O_3$. This component is said to provide solubility in the physiological medium. It can be assumed that increasing the amount of phosphorous within this range increases solubility.

During the manufacture of MMVF wool the components which are to form the fibres are melted in a furnace, such as an electric, shaft, tank or cupola furnace. This produces a melt which may then be fiberised. The melt usually has a melting point of around 1,400° to 1,600° C. and is thus heated to above this temperature in the furnace. It has been found that the inclusion of significant amounts of phosphorous in the melt can lead to some problems. For instance phosphorus may volatilise in the furnace, leading to difficulties of controlling the composition. In particular increasing the amount of phosphorus can adversely influence melt viscosity and properties. It increases the risk of the melt (which contains iron and little or no alkali metal and low aluminium) undergoing phase separation and crystallisation. This leads to the formation and accumulation of solid or slag material in or on the apparatus being used for forming the melt and converting the melt to fibres, and can cause increased amount of shot formation during the fibre-formation process, reduced material efficiency and higher costs.

It would therefore be desirable to form MMVF wool having solubility characteristics of the type which would be expected in such wool from the use of relatively high phosphorus content while avoiding the manufacturing problems associated with relatively high phosphorous contents.

These problems tend to increase as the content of phosphate in the melt increases. For instance difficulties may arise as the content of phosphate increases beyond 5%. It may be possible with some furnaces to use up to 10% phosphate but in general for processing purposes it is undesirable to include more than this.

However, even at low levels of alumina, and in particular when it is not possible to provide a melt having very low levels of alumina, dissolution rates of the fibres are not as high as may be desirable at these levels of phosphate.

Therefore it would be desirable to improve the solubility of MMV fibres in the physiological medium without the necessity for using amounts of phosphate which lead to processing problems.

Fibres containing phosphorus and boron are mentioned in WO94/23801, from which this application claims priority.

SUMMARY OF THE INVENTION AND BRIEF DESCRIPTION OF THE PREFERRED EMBODIMENTS

According to the invention there is provided MMVF wool formed of fibres formed from a composition comprising, by weight of oxides (with iron expressed as FeO):

$SiO_2$ 35–66%

$Al_2O_3$ up to 10%

CaO 10–45%

MgO 2–30%

FeO up to 10%

$Na_2O+K_2O$ 0–7%

$TiO_2$ 0–10%

$P_2O_5+B_2O_3$ and other elements—up to 20% and which includes both $P_2O_5$ and $B_2O_3$.

We find surprisingly that the use of a phosphate- and borate-containing melt can give fibres with adequate physiological solubility produced from a melt which has a combination of good processing, viscosity and temperature characteristics, especially when the amount of $Al_2O_3$ is low.

We find that an upper limit of 10% on the amount of phosphate assists in reducing manufacturing problems, especially phase separation. The amount is preferably 6% or less and is usually below 5%. We find that inclusion of borate increases the physiological solubility of the fibres without the necessity for using larger amounts of phosphate, and allows the use of phosphate even in amounts below 5% whilst retaining adequate physiological solubility. We also find that borate has the additional advantage that it improves the physical properties of the melt, in particular it assists in reducing the melting point of the melt so that the risk of phase separation is reduced.

We also find that the use of boron in phosphorus-containing fibres results in improved fibre properties. For instance tensile strength, modulus of elasticity and length to diameter ratio can be improved. Tensile strength can be >700 MPa. Fibre Modulus of Elasticity can be <150 GPa. Length to fibre ratio can be >700, especially when the fibres are made by a cascade spinner.

The melt viscosity of the composition at 1400° C. is preferably 10–70 poise, preferably 15 to 30 poise.

The fibres preferably have a dissolution rate at pH 7.5 of at least 30 nm/day, and preferably at least 50 or at least 60 nm/day, when measured by the stationary set up method described in Environmental Health Perspectives, Vol. 102, Supplement 5, October 1994, pages 83–86.

The wool of the invention may be provided in any known way. According to the invention we also provide a process of production of MMVF wool formed of fibres having a composition as defined above, the process comprising providing raw materials to give the composition, providing a furnace, placing the raw materials in the furnace and heating them to a temperature between 1,400° C. and 1,600° C. to produce a melt, fiberising the melt, and collecting the fibres as a wool.

In this process we find all the advantages in processing characteristics discussed above. Preferably the wool of the invention are made by this process of the invention.

In the process of the invention the raw materials used to produce the melt may be any known raw materials which give the constituents of the composition. For instance, raw materials which may be used include diabase, cement, clay, olivine sand, silica sand, waste foundry sand, rasorite, colemanite and other boron-containing materials, converter slag, blast-furnace slag, electric arc furnace slag, iron oxide, waste stone wool, waste asbestos, lime, soda, glass waste, dolomite, bauxite, iron silicate, kaoline, calcium phosphate, quartz sand and other known melt ingredients.

The melt composition and hence the composition of the produced fibres preferably comprises at least 45%, often at least 47 or 48%, $SiO_2$. The mount is usually below 64 or 65%, preferably below 60%. Often the amount of $SiO_2$ is from 53.5 to 64%.

The composition preferably has a low alumina content, generally below 6% and preferably below 4%. In general it is very expensive to provide raw materials which contain no alumina at all, so $Al_2O_3$ is present to some extent, usually in amounts of at least 0.5%, although alumina amounts are generally kept as low as possible, preferably below 3 or 2%. Amounts of 1–4% are often suitable.

The composition usually comprises at least 5%, generally at least 10% and preferably at least 15% alkaline earth metal oxides (CaO and MgO). Generally the amount is not more than 50%. Preferably CaO is contained in amounts of between 10 and 35%. In some compositions amounts of 10–20% are preferred but in others amounts of 15 to 30% are preferred. MgO is usually present in an amount of at least 1%, often 5 to 20%, preferably 7 to 20%. For instance it may be in the range 5–15%.

The composition contains iron, and the amount is up to 10% by weight of total composition, measured as FeO. Preferably iron is present in amounts of at least 0.5 or 1%. Amounts of up to 4% are often suitable but amounts may be up to 9 or 10%, e.g., in the range 6.5–9%.

The composition may comprise alkali metals ($Na_2O$ and $K_2O$) in amounts of 0% up to 6% or 7%. In general $Na_2O$ is present in amounts of 0% up to 4% and $K_2O$ is present in amounts up to 2%. Usually each is present in an amount of at least 0.1%, but both are optional and can be omitted.

Phosphate is present in the composition, generally in amounts of between 0.5 and 10%, measured as $P_2O_5$, and often in the range 3 to 6%. For processing purposes it is desirable to keep the amount of phosphate as low as possible whilst incorporating enough to give an adequate dissolution effect. Preferably the phosphate amount is at least 0.5 but below 5% (e.g., up to 4.5%), more preferably below 4%. Usually it is at least 2% or 3%.

Borate is incorporated in useful amounts of up to 10%, measured as $B_2P_3$. The amount is preferably above 0.5 or 1%. In general, enough should be added to increase suitably the physiological dissolution rate, but incorporation of large amounts of borate necessitates the use of very expensive raw materials. Amounts of borate below 5% (e.g., 4.5 and below) can give good results at economic cost but amounts up to 7 or 8% are sometimes preferred. The amount must be sufficient to give a useful effect and so is normally above 0.5 or 1% and preferably it is at least 3%. The amount of $B_2O_3$ is usually below the amount of $P_2O_5$ for reasons of economy.

$TiO_2$ is optional. If present, its amount is usually 0.1 to 2%. The melt composition may additionally comprise 0 to 20% of other ingredients, for instance BaO, ZnO, $ZrO_2$, $F_2$, MnO, $Li_2O$, SrO. The total amount of other ingredients is usually not more than 5%, or at most 10%.

The composition of the melt and of the fibres particularly preferably comprises:

$SiO_2$ 45–64%, preferably 47–60 or 48–60%

$Al_2O_3$ 0.5 to 4%

CaO 10–35%,

MgO 5–20%, preferably 5–15 or 7–15%

FeO 1–10%, preferably 1 to 9%

$Na_2O$ 0 to 4%

$K_2O$ 0 to 2%

$TiO_2$ 0 to 2%

$P_2O_5$ at least 0.5% but preferably below 5%

$B_2O_3$ at least 0.5% but preferably below 5% other elements 0 to 5% all percentages being by weight of total composition and iron oxides being measured as FeO.

The raw materials are placed in a furnace where they are heated to a temperature between 1,400° C. and 1,600° C. in order to produce a melt. In general, they are heated to at least 1,450° C., preferably between 1,450° and 1,540° C., generally around 1,480° C. to 1,520° C.

The furnaces which can be used in the invention for forming the melt which is to be fiberised include cupola furnaces, oil and/or gas fired shaft or tank furnaces or electric furnaces. In these furnaces the invention is particularly advantageous, although the composition also shows advantages when using other known types of furnace. Preferred furnaces are those in which significant amounts of air are drawn. Slag formation and any volatilisation problems can be minimised by the invention.

The melt is fiberised in any known manner. In particular it may be fiberised by pouring into a fast-rotating cup having a substantially horizontal base and perforated side walls out of which is thrown as fibres, or by pouring onto one or more spinning wheels. The or each wheel is mounted on a separate horizontal axis. Melt poured onto the circumference of the spinning wheel is flung off as fibres. Although a single wheel can be used, preferably a cascade system is used in which the melt is poured onto the top rotor of a set of rotating rotors each mounted about a different substantially horizontal axis and arranged such that the melt is thrown from the top rotor onto the subsequent rotor, or on each subsequent rotor in sequence, in the set so as to throw mineral fibres off the or each subsequent rotor into a collection chamber. Any apparatus known for the fiberisation of mineral melts to form wool may be used but a particularly preferred apparatus is described in our patent publication WO92/06047.

The fibres may then be collected as web or batt. The web may be cross-lapped to form a batt. The batt may be consolidated into the desired MMVF wool product in known manner.

Binder is usually included in the batt. For instance it may be sprayed into the fibres before they are collected as a web or batt.

The wool may be in the form of shaped batts or other elements or it may be in the form of tufts or granulates of mineral wool fibres, or in the form of articles made from such tufts or ganulates.

The MMVF wool may be used for any of the conventional purposes of MMVF wool, for instance as a horticultural growing medium, for sound or heat insulation and protection, for fire resistance and protection and as a filler or reinforcement.

The following are examples of suitable compositions, (determined by X-ray fluorescence analysis and measured as weight %) and their dissolution rate at pH 7.5 in nm per day. Each composition can be melted in a cupola furnace and fiberised as in WO92/06047.

Compositions 1, 2, 3 and 4 are within the invention while 1A, 1B, 2A, 3A and 4A are approximate comparisons and show that omitting the boron reduces dissolution rate. The comparative, borate free, compositions tend to slag formation, especially with the higher phosphorous contents.

$Al_2O_3$ 0.5 to 4%
CaO 10 to 30%
MgO 7 to 20%
FeO 1 to 9%
$Na_2O+K_2O$ 0 to 6%
$Na_2O$ 0 to 4%
$K_2O$ 0 to 2%
$TiO_2$ 0.1 to 2%
and which comprises both $P_2O_5$ and $B_2O_3$.

2. A wool according to claim 1 in which each of $P_2O_5$ and $B_2O_3$ is up to 10%.

3. A wool according to claim 1 in which $SiO_2$ is 53.5 to 60% and FeO is 6.5 to 9%.

4. A wool according to claim 1 in which the composition comprises $SiO_2$ 53.5 to 60% by weight
CaO 10 to 20% by weight
MgO 10 to 20% by weight
FeO 6.5 to 9% by weight
$P_2O_5+B_2O_3$ up to 20%, by weight and each is up to 10%.

5. A wool according to claim 1 in which the composition pomprises 7 to 15% MgO by weight.

6. A wool according to claim 1 which comprises $P_2O_5$ in an amount of 1 to 5% and $B_2O_3$ in an amount of 1 to 10%.

7. A wool according to claim 1 in which the amount of $P_2O_5$ is 0.5 to 4.5% and/or the amount of $B_2O_3$ is 0.5 to 4.5%.

8. A wool according to claim 1 having a dissolution rate at pH 7.5 of at least 30 nm/day.

9. A process of production of MMVF wool formed of MMV fibres having a composition, expressed as oxides by weight of total composition, which comprises $SiO_2$ 45 to 60%
$Al_2O_3$ 0.5 to 4%
CaO 10 to 30%
MgO 7 to 20%
FeO 1 to 9%
$Na_2O+K_2O$ 0.1 to 2%
$P_2O_5+B_2O_3$ up to 20%
and which includes both $P_2O_5$ and $B_2O_3$
the process comprising
providing raw materials to give the composition,
providing a furnace,
heating the raw materials in the furnace to a temperature between 1,400° C. and 1,600° C. to provide a melt, fiberising the melt, and collecting the fibres as wool.

| Compositions | $SiO_2$ | $Al_2O_3$ | $TiO_2$ | FeO | CaO | MgO | $Na_2O$ | $K_2O$ | $B_2O_3$ | $P_2O_5$ | Dissolution Rate pH 7.5 |
|---|---|---|---|---|---|---|---|---|---|---|---|
| 1  | 53,4 | 3,6 | 0,5 | 2,5 | 16,9 | 10,1 | 3   | 0,5 | 5,1 | 3,2 | 65,5 |
| 1A | 56,4 | 3,5 | 0,5 | 1,8 | 19,7 | 10,7 | 4,3 | 0,5 | 0   | 2,8 | 40,3 |
| 1B | 54,6 | 4,3 | 0,6 | 2,8 | 15,6 | 10,6 | 4,7 | 0,6 | 0   | 1,3 | 8,6 |
| 2  | 58,1 | 3,3 | 0,5 | 2,1 | 18,9 | 10,3 | 3,4 | 0,5 | 3,2 | 2,5 | 53,9 |
| 2A | 56,4 | 3,5 | 0,5 | 1,8 | 19,7 | 10,7 | 4,3 | 0,5 | 0   | 2,8 | 40,3 |
| 3  | 47,8 | 1   | 0,1 | 1,1 | 33,2 | 8,3  | 0,1 | 0,1 | 2,2 | 4   | 54,8 |
| 3A | 46,9 | 2,4 | 0,4 | 1,3 | 32   | 9,2  | 0,1 | 0,5 | 0   | 6   | 23,8 |
| 4  | 54,2 | 2,4 | 0,1 | 3,9 | 21,2 | 8,2  | 0,1 | 0,3 | 5,9 | 2,2 | 57,9 |
| 4A | 53,2 | 3,2 | 0,1 | 7,3 | 23,4 | 5,3  | 0,1 | 0,3 | 0   | 3,6 | 16,7 |

We claim:
1. Mineral wool formed of MMV fibres having a composition, expressed as oxides by weight of total composition, which comprises
$SiO_2$ 45 to 60%

10. A process according to claim 9 in which the furnace is a cupola furnace.

11. A wool according to claim 2 in which $SiO_2$ is 53.5 to 60% and FeO is 6.5 to 9%.

12. A wool according to claim 1 in which the amount of $B_2O_3$ is 1 to 5%.

13. A wool according to claim 1 in which the amount of $P_2O_5$ is 0.5 to 5% and the amount of $B_2O_3$ is 0.5 to 5.

14. Mineral wool formed of MMV fibres having a composition, expressed as oxides by weight of total composition, which comprises $Sio_2$ 45 to 60%
$Al_2O_3$ 0.5 to 4%
CaO 10 to 30%
MgO 7 to 20%
FeO 6.5 to 9%
$Na_2O+K_2O$ 0 to 6%
$Na_2O$ 0 to 4%
$K_2O$ 0 to 2%
$TiO_2$ 0.1 to 2%
$P_2O_5+B_2O_3$ up to 20% and which includes both $P_2O_5$ and $B_2O_3$.

15. A process of production of MMVF wool formed of MKV fibres having a composition, expressed as oxides by weight of total composition, which comprises $SiO_2$ 45 to 60%
$Al_2O_3$ 0.5 to 4%
CaO 10 to 30%
MgO 7 to 20%
FeO 6.5 to 9%
$Na_2O+K_2O$ 0 to 6%
$Na_2O$ 0 to 4%
$K_2O$ 0 to 2%
$TiO_2$ 0.1 to 2%
$P_2O_5+B_2O_3$ up to 20% and which includes both $P_2O_5$ and $B_2O_3$ the process comprising providing raw materials to give the composition,
providing a furnace,
heating the raw materials in the furnace to a temperature between 1,400° C. and 1,600° C. to provide a melt, fiberising the melt, and collecting the fibres as wool.

16. A process according to claim 15 in which the furnace is a cupola furnace.

* * * * *